(12) United States Patent
Jacobson et al.

(10) Patent No.: US 6,213,522 B1
(45) Date of Patent: Apr. 10, 2001

(54) DEVICE FOR SECURING ADJACENT SEGMENTS OF FIBROUS GLASS DUCT WORK AND THE LIKE AND A SYSTEM INCLUDING SAID DEVICE

(75) Inventors: David L. Jacobson, Phoenixville; Murray S. Toas, Norristown; Thomas A. Cuthbertson, Royersford; Robert W. Storey, Downingtown; Kurt O. Mankell, Blue Bell, all of PA (US)

(73) Assignee: Certainteed Corporation, Valley Forge, PA (US)

( * ) Notice: Subject to any disclaimer, the term of this patent is extended or adjusted under 35 U.S.C. 154(b) by 0 days.

(21) Appl. No.: 09/224,552

(22) Filed: Dec. 31, 1998

(51) Int. Cl.[7] ....................................... F16L 3/22
(52) U.S. Cl. ........................... 285/64; 285/331; 285/398; 285/404; 285/423; 285/424
(58) Field of Search ................................. 285/424, 405, 285/364, 423, 331, 404, 398, 371, 360, 64; 138/DIG. 2, DIG. 4

(56) References Cited

U.S. PATENT DOCUMENTS

| | | | |
|---|---|---|---|
| 1,440,814 | * 1/1923 | Bins | 285/260 |
| 2,227,570 | 1/1941 | Burson | 72/118 |
| 2,328,051 | 8/1943 | Bull | 20/4 |
| 2,335,303 | 11/1943 | Olsen | 72/118 |
| 2,831,222 | 4/1958 | Anderson | 20/92 |
| 3,187,389 | 6/1965 | Anderson | 20/92 |
| 3,687,168 | * 8/1972 | Webster et al. | 285/424 |
| 3,759,159 | * 9/1973 | Rachlin et al. | 138/DIG. 2 |
| 3,836,181 | * 9/1974 | Kelver | 285/424 |
| 4,099,749 | * 7/1978 | Villet | 285/424 |
| 4,187,653 | 2/1980 | Kliewer, Jr. | 52/98 |
| 4,679,832 | * 7/1987 | Meinig | 285/424 |
| 4,819,972 | * 4/1989 | Champa | 285/331 |
| 4,890,864 | 1/1990 | Anderson et al. | 285/121 |
| 5,240,292 | 8/1993 | Roszin | 285/53 |
| 5,285,818 | * 2/1994 | Hummert . | |
| 5,378,028 | * 1/1995 | Havai | 285/331 |
| 5,632,128 | 5/1997 | Agar | 52/489.2 |
| 5,644,883 | 7/1997 | Menchetti | 52/489.1 |
| 5,743,058 | 4/1998 | Boomsma | 52/481.2 |

* cited by examiner

Primary Examiner—Dave W. Arola
(74) Attorney, Agent, or Firm—Duane, Morris & Heckscher LLP

(57) ABSTRACT

A device and system for securing adjacent segments of duct work formed from fibrous glass duct board insulation and the like is disclosed. The device comprises a corner member having two legs disposed at approximately right angles, each of said legs having oppositely facing and substantially parallel adjacent channels disposed therein to accommodate portions of opposed edges of adjacent segments of duct work. The system includes a plurality of corner members each having two legs disposed at approximately right angles, said legs having substantially parallel and oppositely facing adjacent channels disposed therein to accommodate at least a portion of the opposed edges of adjacent segments of duct work.

8 Claims, 6 Drawing Sheets

DEVICE FOR SECURING ADJACENT SEGMENTS OF FIBROUS GLASS DUCT WORK AND THE LIKE AND A SYSTEM INCLUDING SAID DEVICE

BACKGROUND OF THE INVENTION

The use of rigid fibrous glass ducts to supply and return air for residential and commercial heating, ventilating, and air conditioning systems is well known. The popularity of such duct systems has increased significantly during the past 25 years with millions of feet of fibrous glass duct work presently in operation in schools, shopping centers, office buildings, apartments, and residences throughout the United States. When compared to a traditional metal duct system, the use of a fibrous glass duct system can improve the overall quality of the indoor environment through its efficient thermal and acoustical properties, and its ability to virtually eliminate condensation problems. Moreover, a fiber glass duct system is generally less expensive to install than an insulated and sealed wrapped or lined sheet metal system because of faster and easier fabrication and installation. Fiber glass duct systems are also less weight and therefore easier to handle as compared to sheet metal systems.

Rigid fibrous glass ducts are fabricated from sheets of resin bonded inorganic glass fibers. Typically, one major surface of the sheet (hereinafter called duct board) includes a facing which serves as a finish and an air barrier/vapor retarder. The facing is typically a metal foil or a reinforced foil laminate. This faced surface ultimately serves as the outside surface of the assembled duct system.

Frequently, the other major surface of the duct board is coated or faced with a material to improve resistance to fabrication and job site installation damage and to provide the airstream surface of the assembled duct system with an abrasion resistant surface which may be cleaned with commonly available duct cleaning equipment. Duct board can vary in thickness, but is commonly supplied in 1 inch and 1½ inch configurations.

The duct boards are fabricated by folding into square, rectangular, or multi-sided duct sections for use in both residential and commercial heating, ventilating, and air conditioning duct systems. The board is grooved at the fold lines and formed into duct sections, which are then stapled and sealed at the longitudinal joint. Sections are joined in the same way. Frequently, the duct boards are supplied with factory molded male and female shiplap edges to ensure tight and strong fabricated joints. In one commercially available configuration, the outside reinforced foil laminate air barrier extends over the full width of the male shiplap edges to serve as a sealing or stapling flap during fabrication. Duct boards are also commercially available without the shiplap edges in a butt edge configuration. Sealing of seams and joints is accomplished through the use of appropriate tapes. Such tapes include pressure-sensitive aluminum foil tapes, heat-activated aluminum foil/scrim tapes, and mastic and glass fabric tape systems.

Duct systems are frequently suspended from ceiling joists or rafters. Hangers and supports for the duct work are generally fabricated from metal channels, straps, rods and/or wires.

While the use of fibrous glass duct boards to form duct systems has resulted in significant improvements in the fabrication, installation and performance of residential and commercial air handling systems, further improvement would be beneficial. For instance, it would be beneficial if there were a device which would facilitate and improve the method of joining adjacent sections of duct work and result in stronger joints. It would also be beneficial if such a device could provide positive mechanical securement beyond that which is provided by the practice of taping to secure adjacent sections of duct work in place. Moreover, it would be beneficial if such a device could also be used to facilitate the hanging of the duct system.

SUMMARY OF THE INVENTION

The present invention is directed to devices for securing adjacent segments of fiber glass duct work and the like and to a system utilizing one or more of said devices to secure segments of duct work. One embodiment of one such device comprises a corner member having two legs at right angles relative to each other. Each of said legs includes two substantially parallel channels which face in opposite directions in order to accommodate portions of the opposed edges of adjacent segments of duct work formed from folding individual pieces of duct board. One embodiment is specifically designed to accommodate duct work formed with male and female shiplap edges. Another embodiment is designed to accommodate duct work formed with a butt edge configuration. The channels in either embodiment may additionally include one or more teeth-like projections in order to penetrate or otherwise mechanically hold or grip the duct board in a secure manner. Furthermore, the devices may include in the body thereof a grommet, hole, slot, hook, loop or the like in order to accommodate a strap, rod or wire when installing the duct work in a suspended manner from ceiling joists or rafters. In a further embodiment, one or more holes are located in the channels in order to accommodate a screw or similar securing means to provide additional strength once the duct work is assembled. In another embodiment, the device comprises a lineal member in which are disposed substantially parallel and oppositely facing adjacent channels to accommodate portions of the opposed edges of adjacent segments of the duct work. Devices falling within the scope of the invention, can be made of metal or plastic—either thermoplastic or thermoset, or another suitable material.

BRIEF DESCRIPTIONS OF THE DRAWINGS

DETAILED DESCRIPTION OF THE PREFERRED EMBODIMENTS

Figure 1:
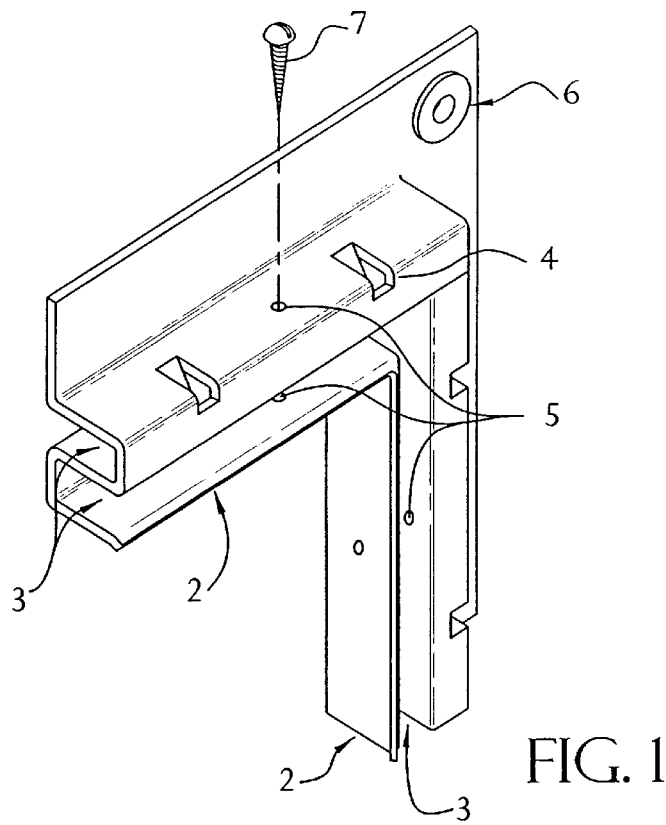
FIG. 1 shows a perspective view of one embodiment of the corner member for use with duct work segments having male and female shiplap edges.

Referring now to the accompanying drawings, FIG. 1 shows a preferred embodiment of a corner member falling within the scope of the present invention. The corner member can be fabricated from metal, plastic or any other suitable material. For example, the corner member can be molded using an appropriate thermoplastic material or thermoset material. As illustrated, the device includes leg members 2 which are disposed approximately at right angles relative to each other. Included within each leg are two parallel channels 3 which face in opposite directions. The channels 3 are designed to respectively accommodate the male and female shiplap edges of adjacent segments of duct work. As is also shown in FIG. 1, teeth-like projections 4 protrude into the channels 3 in such manner as to provide additional mechanical securement for an inserted edge of duct work. For further securement, screws 7 can be inserted through holes 5 once the edges of the duct work are inserted into the appropriate channels. The Grommet or hole 6 located at the central corner of the device provides an anchor for a wire to hang and secure the duct work in place after assembly.

Figure 2:
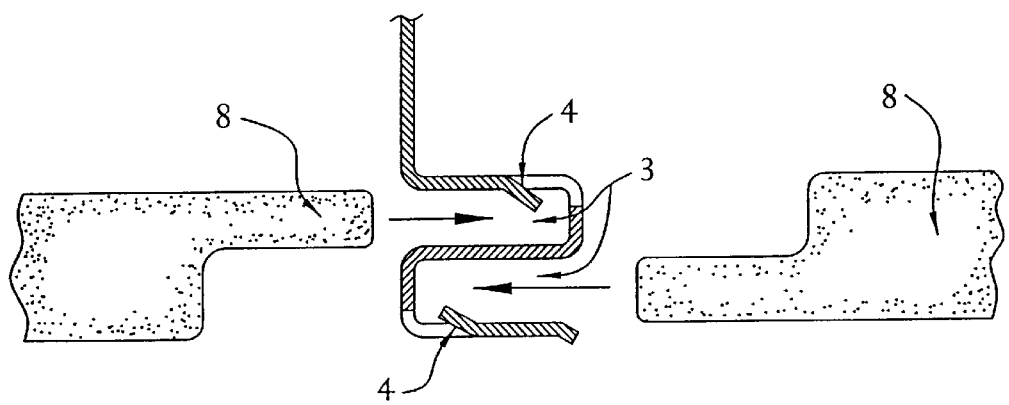
FIG. 2 shows a cross-sectional close-up view of one of the legs of the corner member shown in FIG. 1 along with portions of the shiplap edges of the duct work prior to insertion into the channels located in the leg.
Figure 3:
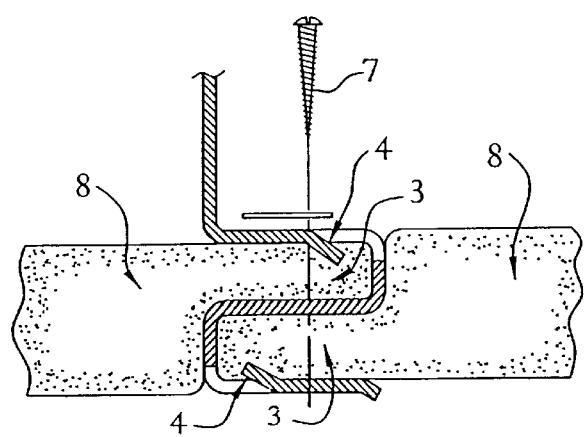
FIG. 3 shows the same view as FIG. 2 but with the shiplap edges of the adjacent sections of duct work inserted into the channels.

FIGS. 2 and 3 show close-up cross-sectional views of the channels located in one of the legs shown in FIG. 1. As shown, male and female shiplap edges of adjacent sections of duct work 8 are inserted into channels 3 and secured in place by projections 4.

Figure 4:
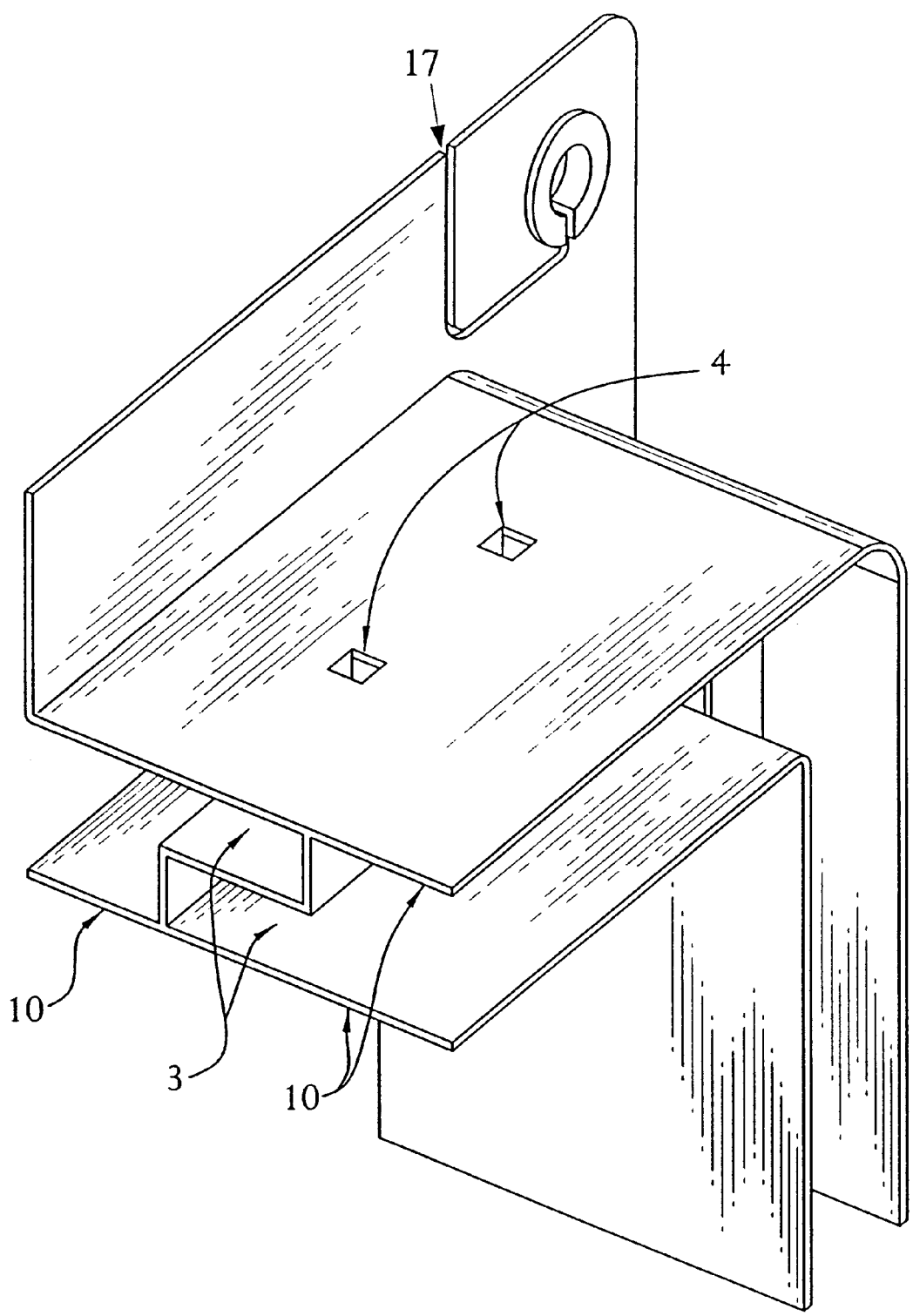
FIG. 4 shows a perspective view of another embodiment of the corner member with extended channels for additional securement for use with duct work segments having male and female shiplap edges.
Figure 5:
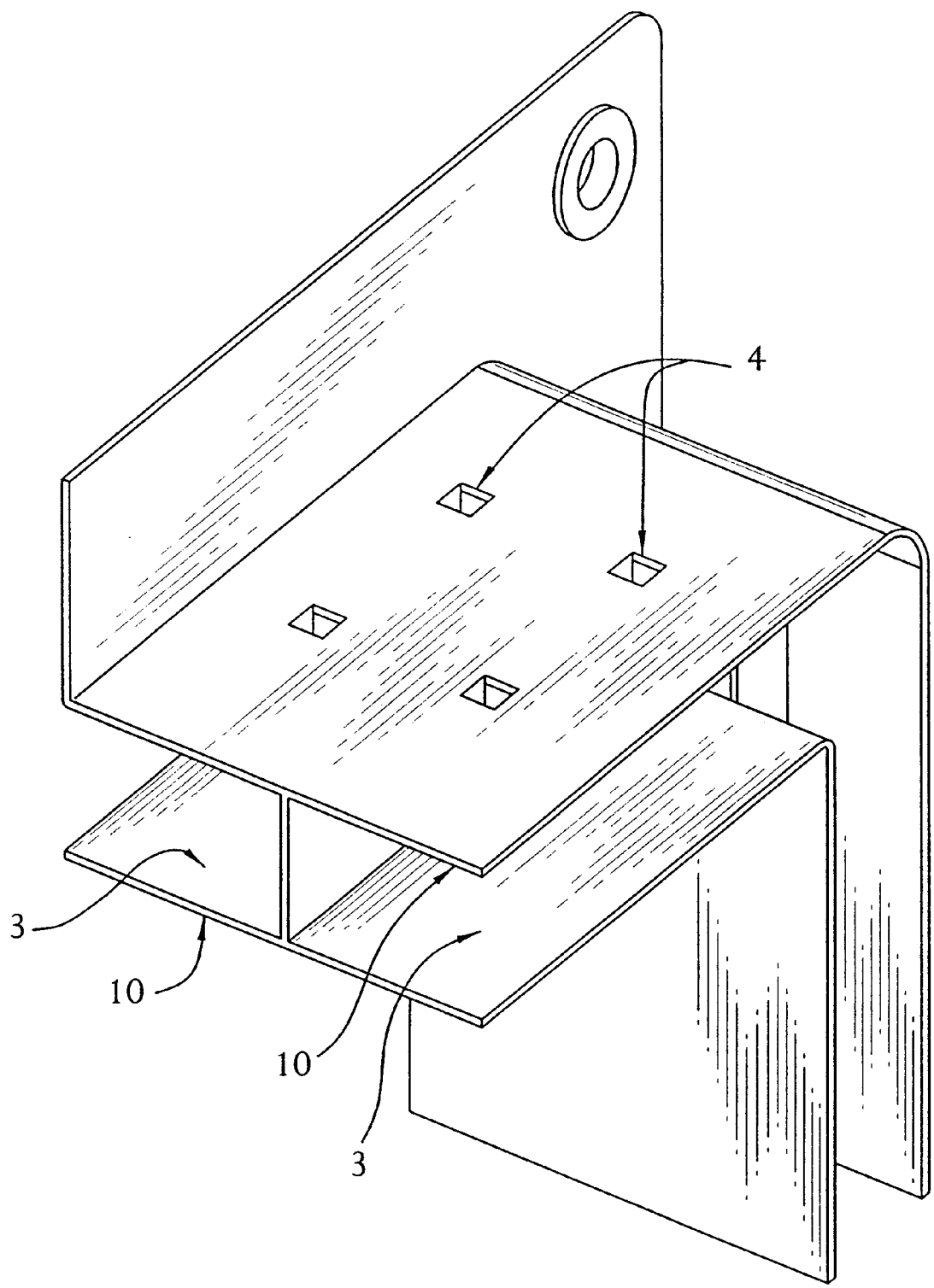
FIG. 5 shows a perspective view of another embodiment of the corner member with extended channels for additional securement for use with duct work segments having a butt edge configuration.

FIG. 4 illustrates another preferred embodiment of the invention in which the walls 10 of the channels 3 are extended to provide additional securement of the assembled duct work. The bottom portion of projections 4 can be seen in FIG. 4. In the embodiment depicted in FIG. 5, channels 3 are designed to accommodate butt edged duct work rather than that with shiplap edges. Again, the bottom portion of projections 4 can also be seen in FIG. 5.

Figure 6:
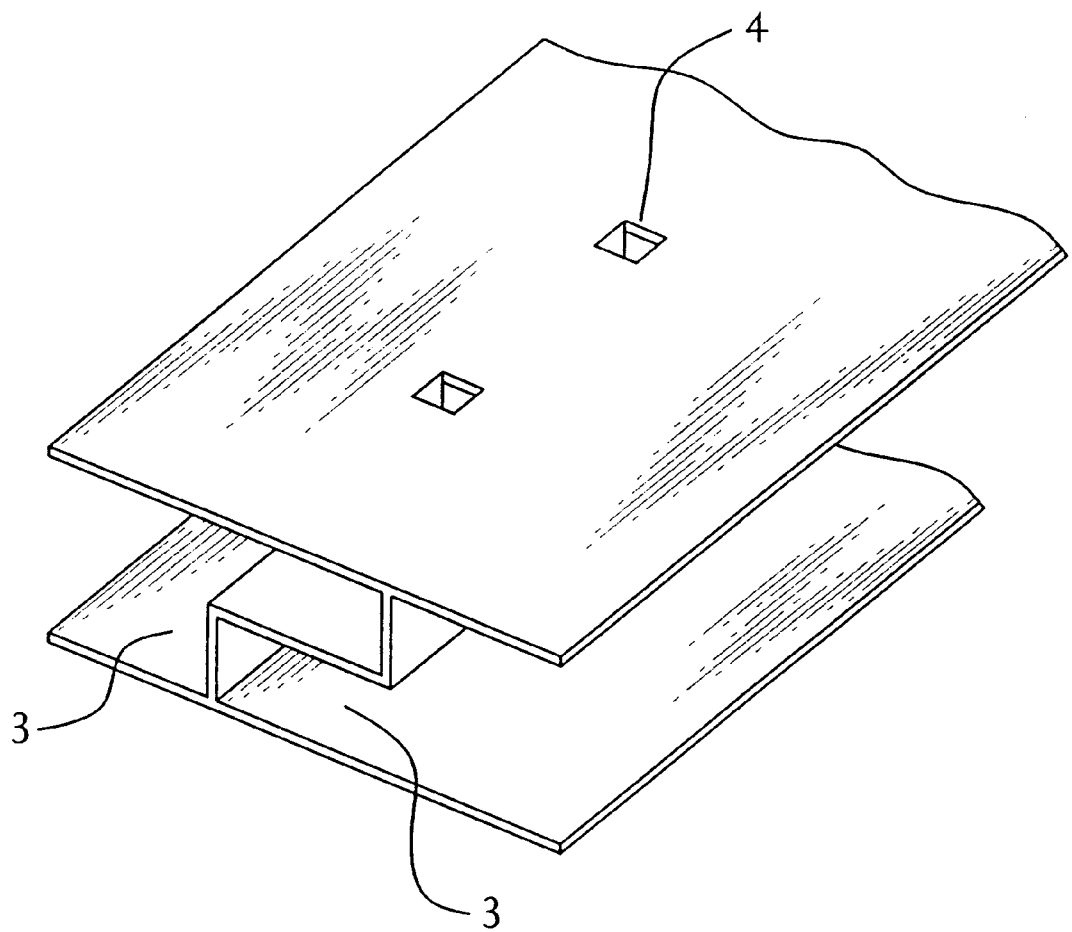
FIG. 6 shows a perspective view of a portion of the lineal embodiment of the invention for use in joining straight portions of shiplap edges of adjacent segments of duct work.

FIG. 6 depicts a portion of another embodiment of the invention for securing adjacent lineal sections of duct work. This embodiment can be used to secure that portion of the edges of the duct work which lies between the corners and is especially useful for duct work with a rectangular cross-sectional area in which two sides are longer than the other two sides and where additional securement would be beneficial. The length of the device in FIG. 6 can be varied as desired, as can the length of the legs in the embodiments depicted in FIGS. 1,4 and 5. As illustrated in FIG. 6, the channels 3 are designed to accommodate shiplap edges.

Figure 7:
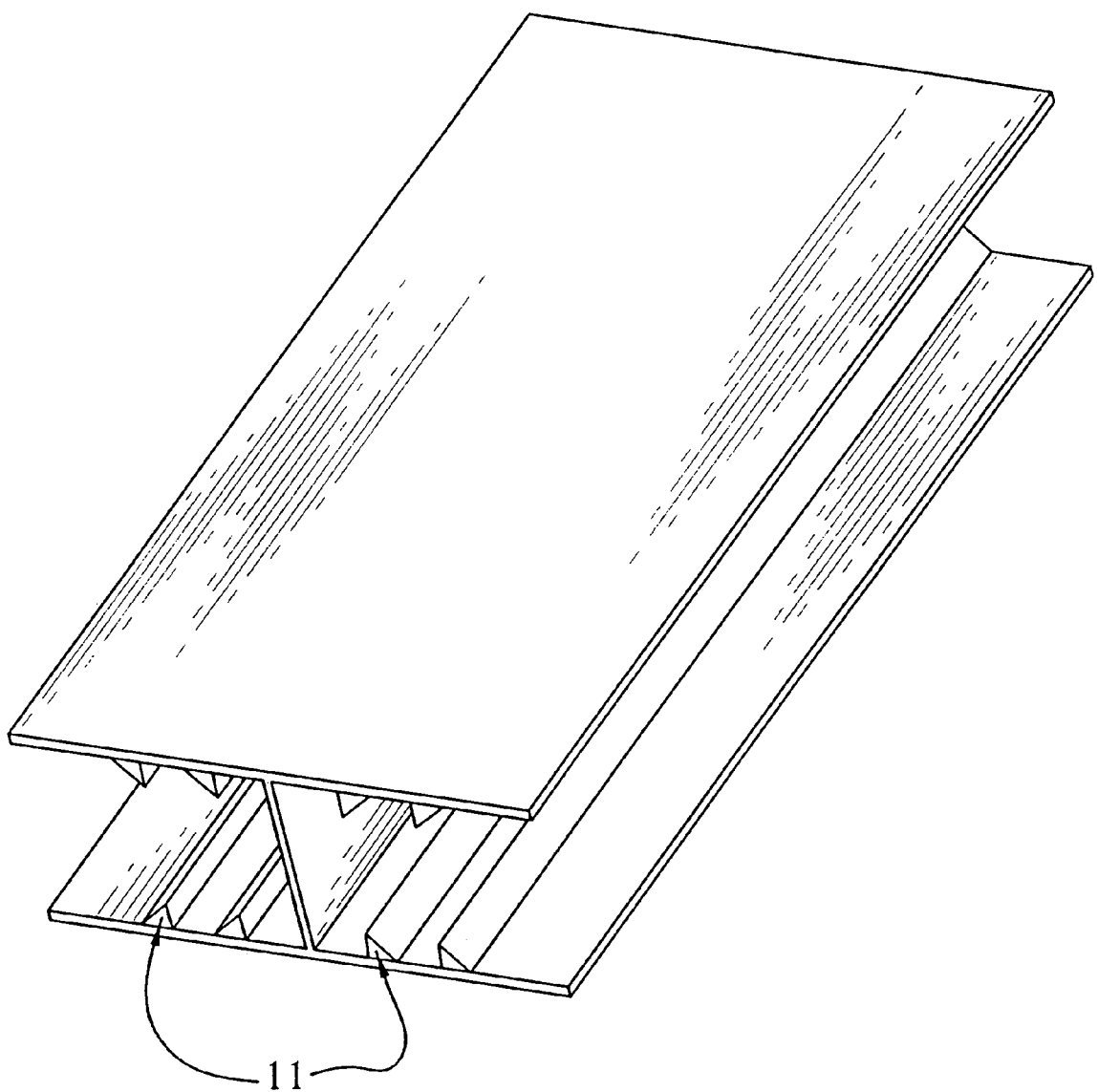
FIG. 7 shows a perspective view of another embodiment of the lineal member for use in joining straight portions of butt edged adjacent segments of duct work.

The embodiment depicted in FIG. 7 is designed to accommodate lineal portions of the edges of duct work having a butt edged configuration. FIG. 7 also depicts another embodiment of the projections 11 used to provide additional securement to the inserted portions of the duct work.

Figure 8:
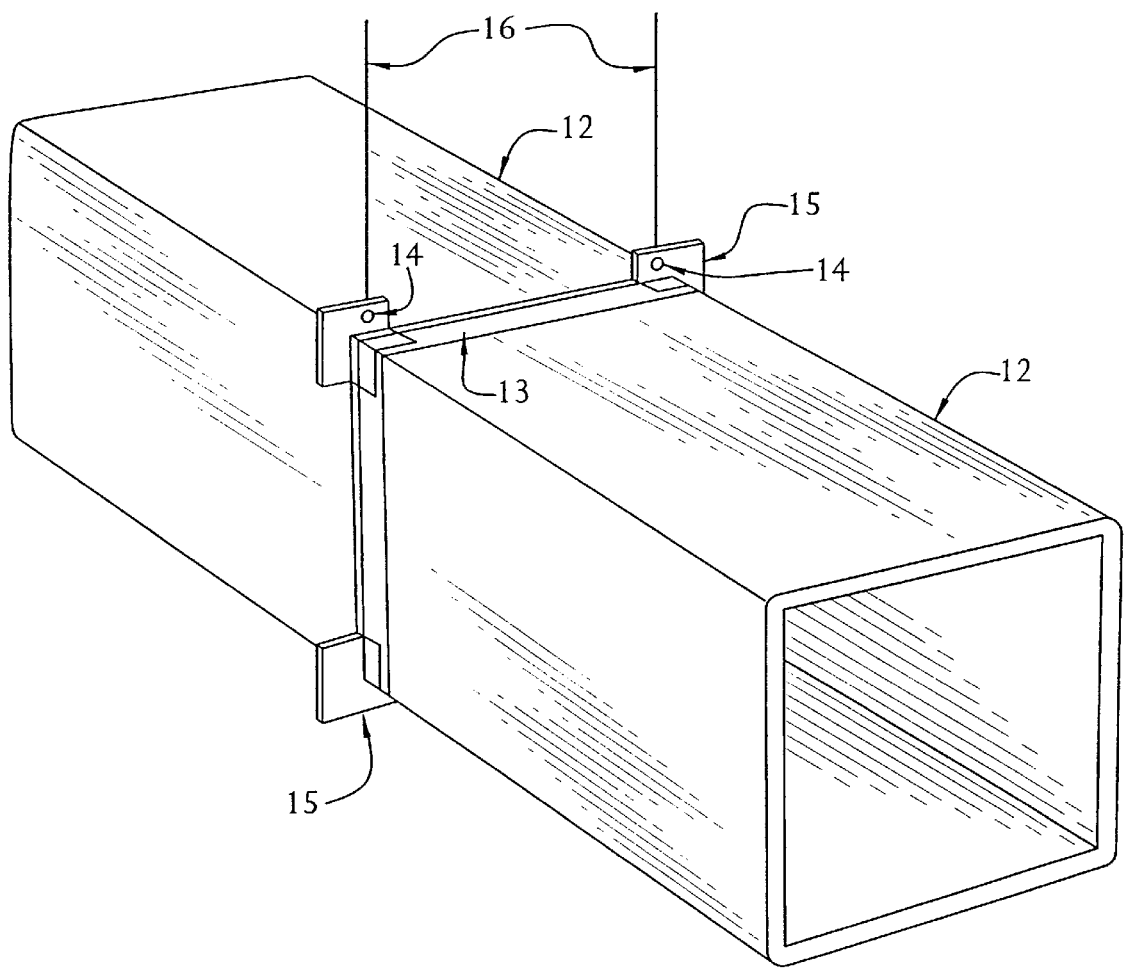
FIG. 8 shows a perspective view of two adjacent segments of duct work joined together using one embodiment of the corner members of the invention.

In FIG. 8, two adjacent sections of duct work 12 are shown in assembled relationship with corner members 15. Holes 14 in corner members 15 can accommodate wires 16 used for hanging the assembled duct work in a suspended manner. Appropriate tape 13 is used to seal and further secure the assembly as illustrated in FIG. 8. Such appropriate tapes include pressure-sensitive aluminum foil tapes, heat-activated aluminum foil/scrim tapes, mastic and glass fabric tape systems, and other appropriate tapes.

The foregoing disclosure illustrates various modes devised by the inventors for practicing the invention. It will be apparent, however, that devices incorporating modifications and variations will be obvious to one skilled in the art of fabricating and installing fiber glass duct work. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims and their equivalents.

We claim:

1. A system for securing adjacent segments of duct work formed from fibrous glass duct board insulation and the like comprising:
    a) A plurality of corner members each having two legs disposed at approximately right angles, and;
    b) said legs having substantially parallel and oppositely facing adjacent channels disposed therein to accommodate at least a portion of the opposed edges of adjacent segments of said duct work, and wherein said corner members include a hook or loop-like projection for attaching a wire or rod when installing the duct work.

2. The system of claim 1 further comprising lineal members having disposed therein oppositely facing adjacent channels to accommodate the opposed edges of at least a portion of the remaining perimeter of the transverse edges of said duct work segments.

3. The system of claim 1 wherein said channels include securing means disposed therein to secure said opposed edges of adjacent segments of said duct work.

4. The system of claim 3 wherein said securing means is comprised of a plurality of teeth like projections to secure said opposed edges of adjacent segments of said duct work.

5. The system of claim 1 wherein said corner members are comprised of a thermoplastic material.

6. The system of claim 1 wherein said corner members are comprised of a thermoset material.

7. The system of claim 1 wherein said corner members are comprised of metal.

8. The system of claim 1 wherein said channels include holes therein to accommodate a screw to further secure said opposed edges of adjacent segments of duct work.

* * * * *